United States Patent [19]
Bailey

[11] Patent Number: 5,779,890
[45] Date of Patent: Jul. 14, 1998

[54] MULTI-EDUCTOR SYSTEM

[75] Inventor: Elena Bailey, Austin, Tex.

[73] Assignee: Enviroquip, Inc., Austin, Tex.

[21] Appl. No.: 746,752

[22] Filed: Nov. 13, 1996

[51] Int. Cl.[6] .................................................... C02F 3/20
[52] U.S. Cl. ........................ 210/197; 210/220; 210/629; 261/77; 261/123
[58] Field of Search ............................. 210/194, 197, 210/220, 629; 261/77, 123

[56] References Cited

U.S. PATENT DOCUMENTS

| 2,144,385 | 1/1939 | Nordell | 210/629 |
|---|---|---|---|
| 3,043,433 | 7/1962 | Singer | 210/197 |
| 3,055,502 | 9/1962 | Cunetta | 210/197 |
| 3,337,449 | 8/1967 | Kappe | 210/220 |
| 3,415,378 | 12/1968 | Fukuda | 210/220 |
| 3,696,029 | 10/1972 | Walker | 210/220 |
| 4,720,360 | 1/1988 | Melber | 261/123 |
| 4,863,644 | 9/1989 | Harrington et al. | 261/123 |
| 4,933,076 | 6/1990 | Oshima et al. | 210/629 |
| 4,938,899 | 7/1990 | Oros et al. | 261/123 |
| 5,200,081 | 4/1993 | Stuth | 210/220 |

FOREIGN PATENT DOCUMENTS 52-19462  2/1977  Japan .

OTHER PUBLICATIONS

"Breakthrough in Sewage Treatment, Cash, Land and Energy Saved," from Water Services, Apr. 1975, pp. 132 and 140.

Primary Examiner—Christopher Upton
Attorney, Agent, or Firm—Thomas M. Freiburger

[57] ABSTRACT

Improved gas distribution and mixing is achieved in a gas/liquid mixing basin particularly for aerobic or anaerobic sewage digesters. In addition to a draft tube positioned generally centrally in the aeration or anaerobic basin and served by one or more gas-releasing diffusers, the system of the invention includes peripheral draft tubes surrounding the central draft tube, each tube having at least one gas diffuser within. The circulation of liquid and gas bubbles from the larger, central draft tube is supplemented by circulation from the peripheral draft tubes. In particular, "dead areas" or less active areas of the liquid, which are not sufficiently reached by gas-mixing from a single draft tube in many basin configurations, are reached by circulation from the peripheral draft tubes and such dead areas are virtually eliminated. As a result, power requirements can be reduced when compared to double throw or single drop systems, thus increasing overall system efficiency while achieving the desired level of liquid aeration or gas dispersion. In addition, the inclusion of the peripheral draft tubes allows versatility in achieving the desired degree of mixing in a wide range of different basin configurations.

19 Claims, 9 Drawing Sheets

MULTI-EDUCTOR SYSTEM

BACKGROUND OF THE INVENTION

The invention relates to systems for mixing a gas into a liquid within a basin. More particularly, the invention addresses the problem of "dead areas" or less active areas within a gas/liquid mixing basin served by one or more eductors with drop pipes and diffusers, as in aerobic or anaerobic sewage digester basins.

Aeration systems are well known in aerobic digesters. For example, U.S. Pat. No. 4,863,644 to Harrington discloses an aeration system in which a gas diffuser is suspended within a basin along the center line of a draft tube. U.S. Pat. Nos. 3,696,029 and 4,938,899 also show aeration devices for aeration basins. Anaerobic digesters utilize similar equipment, pumping methane into the liquid.

In the digester field a draft tube is a hollow cylinder, entirely submerged in the liquid basin, surrounding drop pipes and diffusers and designed to cause a circulation or "pumping" of gas bubbles and liquid out the top of the draft tube, toward the basin walls and back into the bottom of the draft tube. Although "draft tube" is usually accepted as meaning such a tube with multiple drop pipes and diffusers (as opposed to "shear tube" with only one drop pipe and diffuser), in this discussion and in the claims "draft tube" is intended to include such tubes having either one or a plurality of drop pipes and diffusers.

In the Harrington patent, a deflector is positioned above the draft tube in order to shear gas bubbles rising from the gas diffuser up through the draft tube. Although the apparatus of the patent does mix the gas emanating from the diffuser with liquid in the basin, the apparatus does not provide for coverage of dead spots or less active areas in the basin liquid, areas not reached by the aeration. Limited and uneven mixing can occur along the height of the draft tube, especially in the middle one-third of the water depth. Furthermore, systems such as that of the Harrington patent have a limited application because they lack flexibility to accommodate the gas mixing requirements of a variety of basin configurations, including a range from very slender basins with a diameter to depth ratio less than 0.5 through basins having diameter to depth ratios greater than 2, and also those with sloped basin floors or irregular floors.

Double throw draft tube aeration systems have also been known. A double throw design comprises a central draft tube with air diffusers within the tube and a larger coaxial draft tube circumscribing the central tube. A plurality of air drops are located between the two draft tubes, i.e. within the larger draft tube. The double throw design offers good mixing but has reduced oxygen transfer efficiencies when compared to systems using single diffusers such as that of the Harrington patent. Furthermore, the double throw design is expensive to manufacture.

For the foregoing reasons, there is a need for a gas mixing system which is of simple, inexpensive construction and flexible enough to accommodate gas mixing requirements of a variety of basin configurations, particularly a range of basins with widely varying diameter to depth ratios, as well as basins having sloped or irregular basin floors. Moreover, there is a need for a gas mixing system which thoroughly mixes the air or other gas with the liquid in the basin, along the full height of the draft tube, especially in the middle third of the liquid depth.

SUMMARY OF THE INVENTION

The present invention is directed to a system that improves the mixing of a gas into a liquid in a basin. The invention embraces a less expensive and more efficient design than the double throw draft tube design discussed above and known in the prior art. The system of the invention has the flexibility to accommodate the gas mixing requirements of a variety of basin configurations, particularly basins having a diameter to depth ratio of greater than 2, as well as basins having sloped floors or irregular floors or basin shapes.

The aeration system of the invention comprises an aeration basin containing a liquid and a central or main draft tube submerged in the liquid. As in prior designs, the central or main draft tube is suspended preferably (but not necessarily) near the center of the basin, with gas diffusers suspended by drop pipes within this draft tube. Gas (usually air) supplied by the gas lines issues from the diffusers within the central draft tube and rises up through the draft tube. When the gas bubbles reach the top of the draft tube, they spread out in the upper part of the basin liquid and circulate toward the perimeter of the basin. A large portion of the bubbles and liquid is then drawn back generally down the basin walls and toward the bottom of the basin and eventually back into the bottom of the central draft tube. The release of the gas in the draft tube acts as a circulating pump.

The invention departs from conventional draft tube designs as above in that a plurality of peripheral draft tubes are mounted at positions surrounding the central draft tube. These may be supported on the central draft tube. Each of the peripheral draft tubes contains at least one air diffuser suspended along its center line. Within the peripheral draft tubes, diffusers release gas bubbles which rise up through the peripheral draft tubes and circulate in the basin. A large portion of the gas bubbles and liquid moving with the bubbles eventually return to the peripheral draft tubes, circulating back to the bottoms of these draft tubes. Circulation of liquid and bubbles from the peripheral draft tubes does not reach as far out in the basin as in the case of the central draft tube.

As a result of the peripheral draft tubes surrounding the central draft tube, gas/liquid mixing in the basin is greatly enhanced, and "dead spots" or less active areas where little gas was mixed into the liquid in prior basin designs are efficiently eliminated. Mixing effectiveness is particularly increased in basins having sloped floors and in basins where the basin diameter to depth ratio is greater than 2.

In a preferred embodiment, deflectors are suspended above each peripheral draft tube. The effect of the deflectors is to increase gas transfer and mixing efficiency in the basin without losing overall operating efficiency (i.e. blower horsepower). Gas bubbles rising from the peripheral draft tubes are sheared into smaller air bubbles on contact with the deflector.

In another preferred embodiment a deflector is positioned twelve inches or less below the average water level, but above the central draft tube, to retain a large portion of the energy produced by the liquid/gas interface, which would otherwise be dissipated at the liquid surface if allowed to rise unobstructed. Such a shallow submerged deflector, which may be termed an energy recovery baffle, is at least as large in diameter and preferably larger than the central draft tube.

Location of the shearing deflectors may be determined by the dimensions of the basin. Similarly, the location, number and size of the peripheral draft tubes may be determined to optimize mixing efficiency depending upon the shape of an individual basin, to eliminate or minimize dead (less active) areas.

Further, other design parameters concerning the peripheral draft tubes may be varied to achieve maximum mixing efficiency in a particular basin. These include use of peripheral draft tubes of differing diameters, all surrounding the same central draft tube; using peripheral draft tubes of varying lengths (heights); varying the position in which a series of peripheral draft tubes are distributed around the central draft tube, with such positioning optionally being adjustable; providing peripheral draft tubes of various shapes such as circular, oval, square or rectangular, or combinations thereof within the same basin; varying the depth of the diffusers within the peripheral draft tubes, including use of different depths in different peripheral draft tubes within a basin, with the diffuser depth being either fixed or adjustable; positioning the individual peripheral draft tubes at different distances from the central draft tube, with such positioning being either fixed or adjustable; and providing peripheral draft tubes surrounding a double throw draft tube, again with any of the variations noted above. All of these variable parameters enable the fine tuning of a gas distribution system within a basin, so as to minimize less active or "dead" areas and so as to maximize efficiency of the system, allowing the use of a relatively low power blower.

It is therefore among the objects of the present invention to improve aeration systems and gas mixing systems in general, by including peripheral draft tubes mounted around a central draft tube. Particularly advantageous in sewage treatment digester basins, the system of the invention is more cost effective than double throw draft tube designs known in the prior art. Further, the invention allows flexibility to accommodate a variety of basin dimensions such as very slender basins or basins with a large diameter to depth ratio, basins with sloping floors, basins with irregular floors and basins with non-circular or otherwise irregular shapes. The invention eliminates areas in the liquid where the gas/liquid mixing is uneven along the length of the central draft tube especially in the middle third of the water depth, providing an overall better mixing efficiency. These and other objects, advantages and features of the invention will be apparent from the following description of preferred embodiments, considered along with the accompanying drawings.

DESCRIPTION OF PREFERRED EMBODIMENTS

Figure 1:
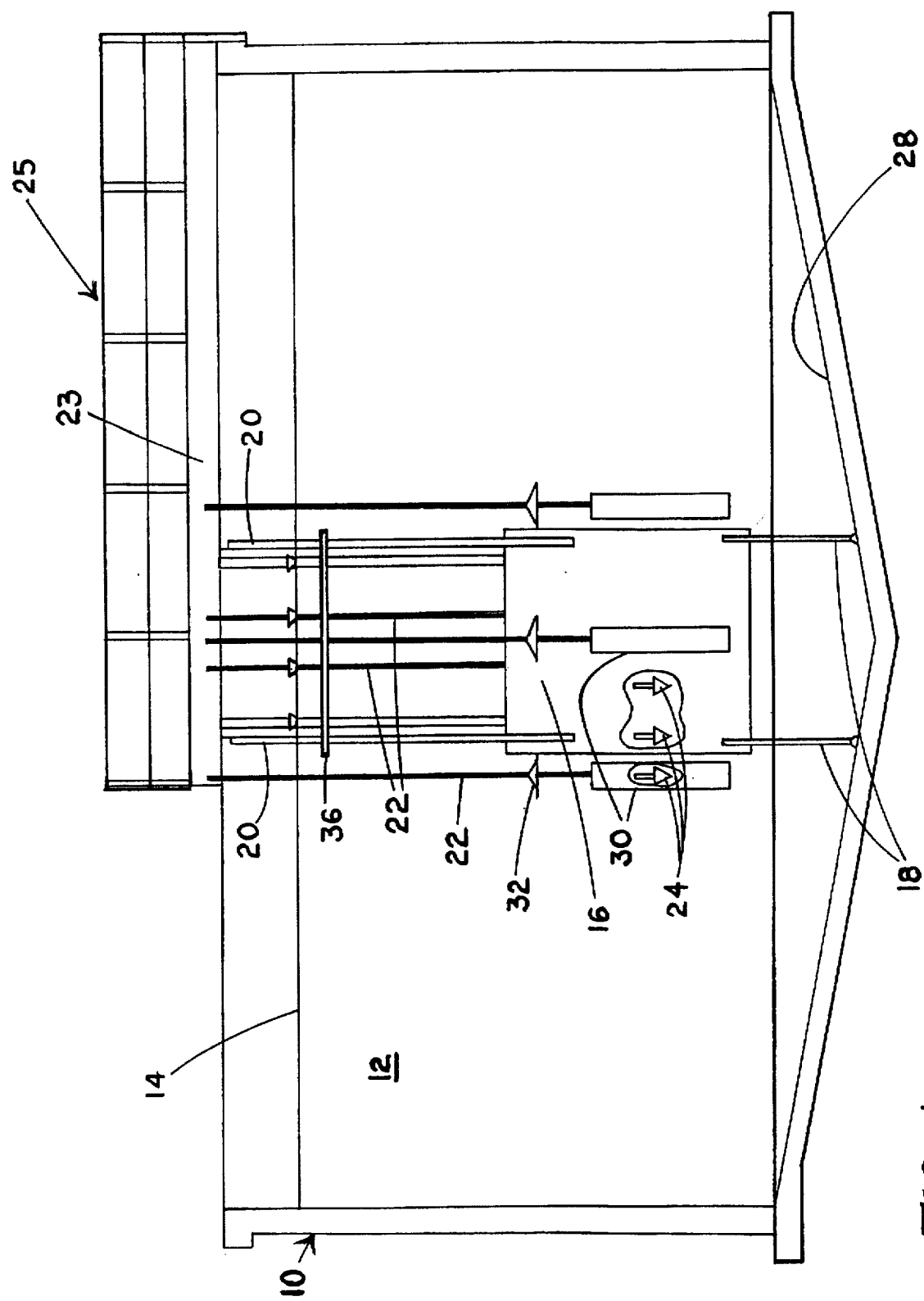
FIG. 1 is a sectional elevation view, partially cut away, indicating a digester or other form of gas/liquid mixing basin, incorporating a central draft tube and peripheral draft tubes in accordance with the invention.
Figure 2:
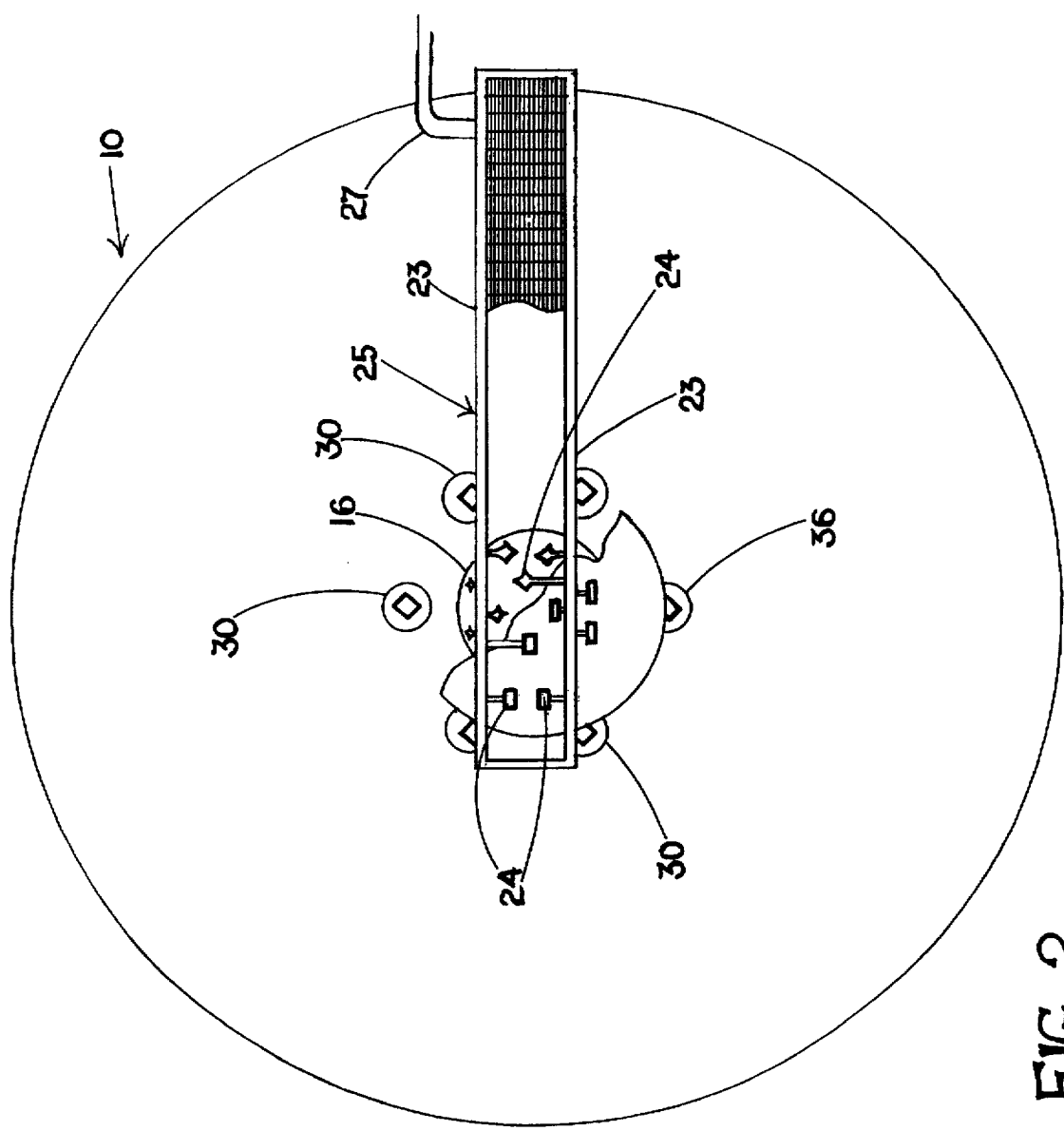
FIG. 2 is a partially cut away plan view showing the basin of FIG. 1.

In the drawings, FIGS. 1 and 2 show a liquid-containing basin 10 such as a digester basin used in sewage treatment. within the basin, which may be sewage to be treated through aerobic or anaerobic digestion in the basin 10, is subjected to gas mixing within the basin to promote the digestion. In this discussion an example of an aerobic digestion process, with air as the gas being mixed into the liquid, will often be mentioned, but this should be taken to include anaerobic digestion processes as well, such as where methane gas is mixed into the liquid.

The digester basin 10 can be in a variety of different shapes, i.e., diameter, height, bottom configuration (sloped or flat), and with or without irregularities. Basins can be square, hexagonal or other shapes, although they often tend to be circular. A digester basin such as shown in FIG. 1 may have a diameter of about 50 feet or even larger, and may have a depth of, for example, about 20 to 25 feet, with the level of the liquid 12 being a few feet less. The surface of the liquid 12 is shown at 14 in FIG. 1.

FIG. 1 shows a central or main draft tube 16, normally (but not necessarily) mounted in the middle of the basin 10, and which may be secured by structural supports 18 and 20 as shown (the main draft tube or tubes may be at non-centered locations, particularly in unusual or elongated basin configurations as shown in FIGS. 7–11 discussed below). The central draft tube 16 is submerged in the liquid and open at upper and lower ends, normally cylindrical in shape (but other shapes may be used). Within the draft tube 16 are a plurality of drop pipes 22, connected into an air or gas distribution system, for delivering air under pressure down into the liquid 12. In the system illustrated in FIGS. 1 and 2 gas is fed into the drop pipes 22 through a box beams 23 which also serve as structural members of a catwalk 25. The drop pipes 22 terminate at a selected level within the central or main draft tube 16, with an air diffuser 24 at the terminal end of each drop pipe. Gas diffusers and orifice devices for this purpose are known and examples are shown in U.S. Pat. Nos. 4,720,360 and 4,863,644.

FIG. 2 shows in plan view the digester basin 10 and indicates schematically the diffusers 24 as connected to the gas supply box beams 23. FIG. 2 illustrates that the diffusers within the draft tube 16 may be twelve in number, in balanced positions for achieving approximately equal gas feed through all diffusers. The box beam conduits 23 are fed by a gas conduit 27 delivering gas from a blower.

As is also known, the use of a draft tube 16 creates a "pumping" effect in the liquid, by confining the released air bubbles to within the draft tube as the bubbles rise, and by providing a specific re-entry area for the gas bubbles, at the open bottom end of the draft tube. The air bubbles circulate to create a current within the aeration basin 10. Et current which is generally shown by the group of arrows 26 in FIG. 1A, on the right, "Prior Art" side of the figure, representing current from a draft tube 16 alone. As described above, a limitation of such central draft tubes is the inability to adequately mix the gas and liquid in certain areas of the basin, primarily the middle one-third of the liquid depth. Thus, the draft tube 16, if used alone as in the prior art, essentially tends to create an outer current as indicated by the arrows 26 on the right side of FIG. 1A. Although there is some movement of bubbles to a lesser extent to the inner side of the arrows 26, that inner activity becomes less and less toward the middle third of the liquid depth and toward the space just outside the central draft tube 16, and these areas, sometimes called "dead areas", are regions of lesser activity wherein air/liquid mixing is incomplete or almost nonexistent.

As an example, if the aeration basin 10 is about 50 feet in diameter, the central draft tube 16 can be about 6 feet in diameter. The draft tube 16 may be about 10 feet in height and may be of galvanized steel. For such a draft tube 16, there may be, for example, four to twelve drop pipes 22 and diffusers 24 provided.

In FIG. 1 the aeration basin 10 is illustrated with a sloped bottom 28. Thus, the draft tube 16 is supported sufficiently above the bottom to adequately receive a return flow of air bubbles, as illustrated by the arrows 26 in FIG. 1A.

Figure 3:
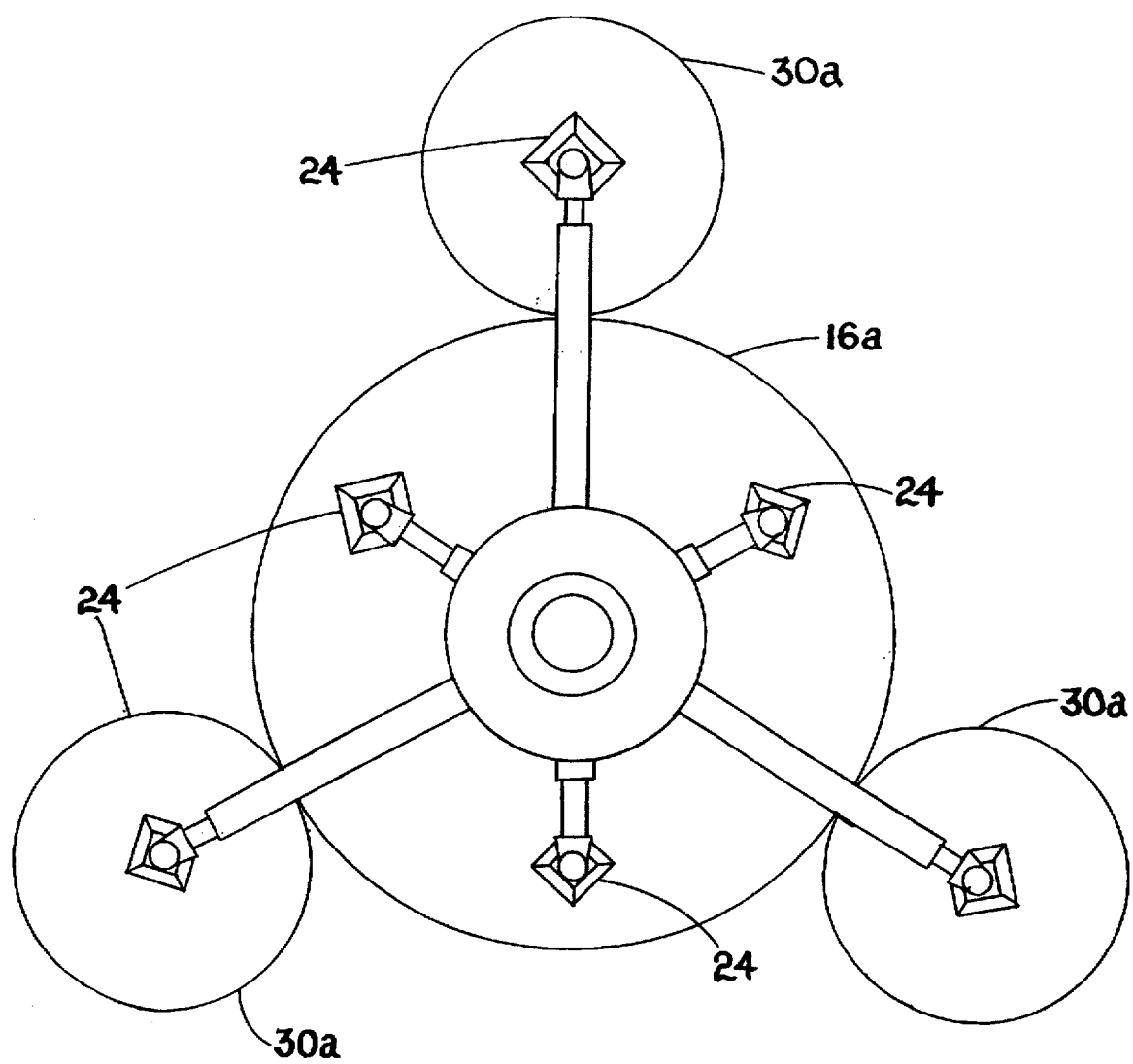
FIG. 3 is an enlarged and somewhat schematic plan view showing one example arrangement of a series of peripheral draft tubes surrounding a central draft tube.

As noted above, the present invention solves the problem of the inadequate air or gas mixing in the described regions of the basin, by providing a plurality of peripheral draft tubes 30 distributed around the central draft tube 16. These may be secured in position by being connected directly to the central draft tube 16a, as shown in FIG. 3, or appropriate struts or brackets may be provided to connect these peripheral draft tubes 30a either to the central draft tube or to the structure supports 18 or to the basin itself. These struts may have capability of adjustment for the height, position or outward spacing from the central draft tube 16, for some or all peripheral draft tubes 30.

FIG. 1 shows an arrangement wherein six peripheral draft tubes 30 are secured in a circular distribution around the main or central draft tube 16, spaced outwardly slightly from the main draft tube. In the example arrangement in FIG. 1 the peripheral draft tubes 30 have a diameter which is only about 15% to 20% of the central draft tube's diameter, with six of the peripheral draft tubes provided. In the arrangement of FIG. 3, the peripheral draft tubes 30a have a diameter approximately half that of the central draft tube 16a, but only three of the peripheral draft tubes are provided. These and other parameters may be widely varied in order to suit the requirements of a particular basin configuration, as noted above.

FIG. 1 shows that each peripheral draft tube may have a deflector 32, a device known in draft tubes for helping shear air bubbles into smaller bubbles and help distribute the bubbles more widely. Such a deflector is shown in the above-referenced U.S. Pat. No. 4,863,644.

As indicated in FIG. 1, each peripheral draft tube 30 has within it at least one drop pipe 22 terminating in a gas diffuser 24, and these may be similar to the diffusers within the draft tube. A single drop pipe/diffuser is generally preferred within each peripheral draft tube 30, although more than one can be used if desired.

Figure 1A:
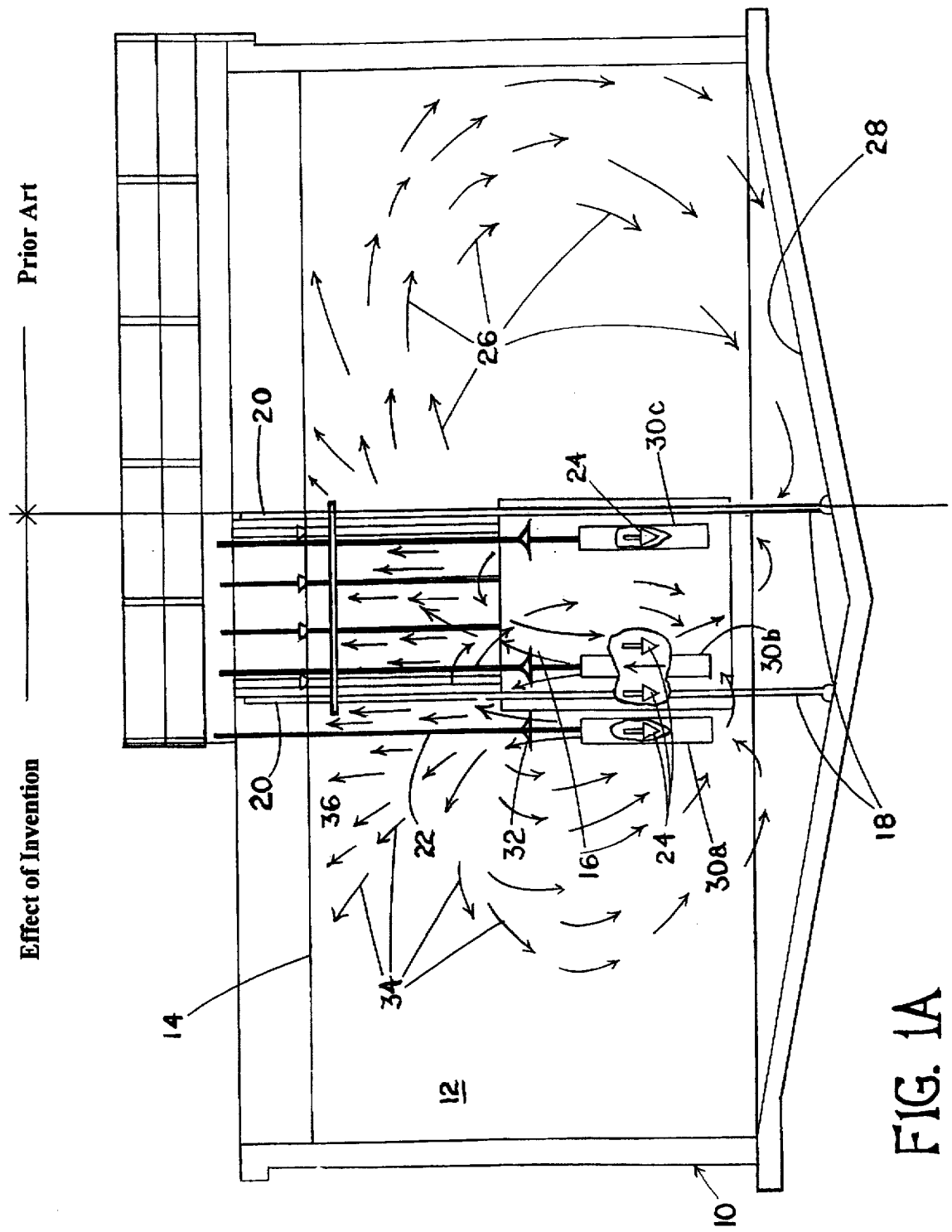
FIGS. 1A and 1B show the effect of the system of the invention in a basin such as in FIG. 1, as compared to prior art with only a central or main draft tube.

As indicated schematically on the left side of FIG. 1A, by current arrows 34, the peripheral draft tubes 30 create an inner current within the aeration basin 10, addressing those areas which were less active under the influence of the central draft tube 16 alone. FIG. 1A shows with the arrows 34 the general effect of the peripheral draft tubes, ignoring currents generated by the central draft tube 16. The peripheral draft tubes address a more local region and greatly improve the efficiency of gas distribution and effect gas/liquid mixing on a more even basis throughout the entire basin 10.

Figure 1B:
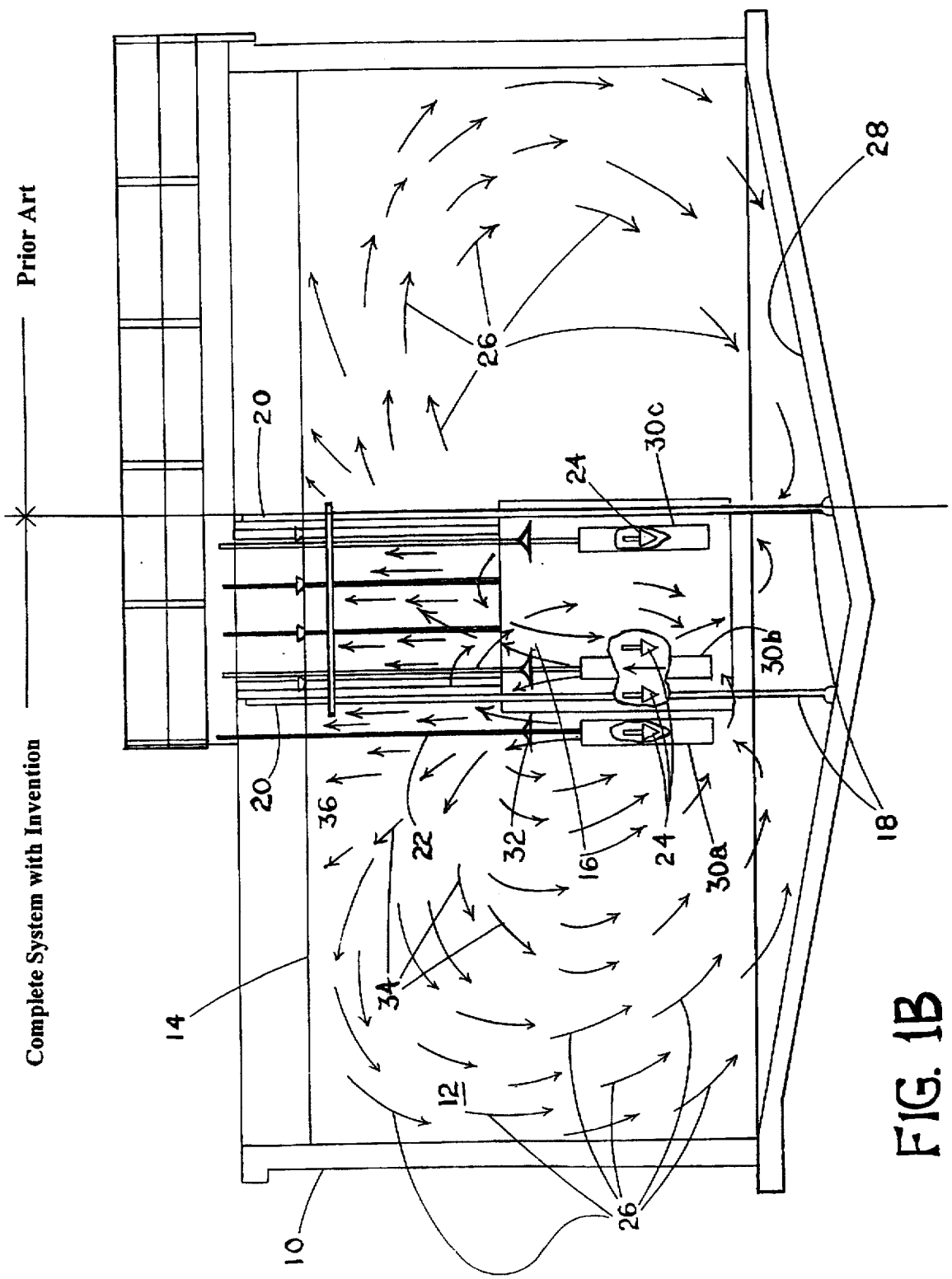

The schematic elevation view of FIG. 1B generally indicates, on the left side of the drawing figure, the combined effect of peripheral draft tubes with the central draft tube 16. Again, the right side of FIG. 1B shows the general currents developed by a central draft tube 16 alone, without any peripheral draft tubes. In FIG. 1B the peripheral draft tubes 30a, 30b and 30c are shown in different heights and at different elevations within the basin and relative to the central draft tube 16, such variation being one way of "tuning" the system of the invention to achieve optimum gas/liquid mixing within a basin which may be non-circular or irregular in shape. The left side of FIG. 1B schematically shows, via arrows 26 and 34, that nearly all regions of the digester basin 10 are permeated with air bubbles and currents, due to the combined effect of the central draft tube 16 and the peripheral draft tubes. The arrows also show that some bubbles and currents will still rise to the surface 14 of the liquid, but with strong circulating currents this is minimized.

The drawings also show the preferred inclusion of an energy recovery baffle 36, to further minimize dissipation of bubbles at the surface of the liquid. This is generally a flat, concave or convex disc, submerged within the liquid preferably about 12 inches or less below the average water level, and preferably extending horizontally beyond the draft tube 16 in all directions. In the system shown in FIG. 1, with a central draft tube 16 approximately 6 feet in diameter, the energy recovery baffle 36 may be about 8 feet in diameter, and about 12 inches below the liquid level. This baffle 36 acts to prevent air bubbles and currents from rising directly to the liquid surface 14, which would dissipate the energy of the air/liquid interface (energy which was required to generate the bubbles). The use of the deflector 36 tends to direct the bubbles and currents outwardly toward the outer reaches of the basin, allowing far fewer of the bubbles to directly dissipate at the surface and providing a saving in energy requirements. The baffle plate 36 may be convex at its bottom side to help direct currents outward; or it may be concave as is the preferred form of the deflectors 32, so that the bubbles tend to rise up into the apex of the baffle before they are eventually carried outwardly by the currents, thus tending to help shear the bubbles to smaller size for efficient mixing.

Figure 4:
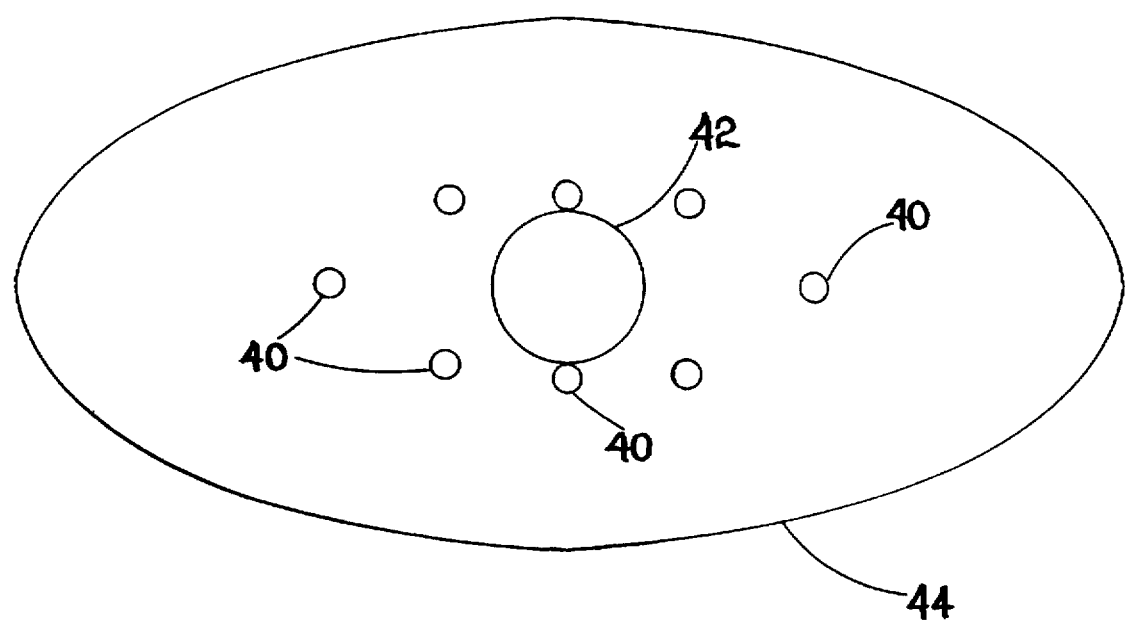
FIG. 4 is a schematic view illustrating another example of an arrangement of peripheral draft tubes around a central draft tube.

FIG. 4 shows very schematically an example of a varied parameter in the system of the invention, wherein a series of peripheral draft tubes 40 are positioned around a central draft tube 42 within an elliptical or oval liquid-containing basin 44. The central and peripheral draft tubes 42 and 40 are similar to those described and referenced above relative to FIGS. 1 and 2, but in this case, the spacing of the peripheral draft tubes 40 from the central draft tube is varied around the perimeter of the central draft tube, to accommodate the elliptical or oval shape of the tank 44. In this example peripheral draft tubes 40 at left and right as viewed in FIG. 4 are most distant from the central draft tube, and additional peripheral draft tubes become closer to the central draft tube toward the center of the ellipse. This arrangement can help address areas of less active mixing activity within the liquid, where the spacing between the central draft tube and the basin wall is most distant.

Peripheral draft tube specifications may be varied in other ways as well, as discussed above. As examples, some of the peripheral draft tubes may be longer than others or placed more deeply than others (see FIGS. 1A and 1B); all or some of the draft tubes may be non-circular in cross section; the peripheral draft tubes may be of different lengths; the spacing of the peripheral draft tubes from the central draft tube may be irregular, due to irregularity in the digester basin bottom or walls; or the peripheral draft tubes may be used with a double throw central draft tube.

Figure 5:
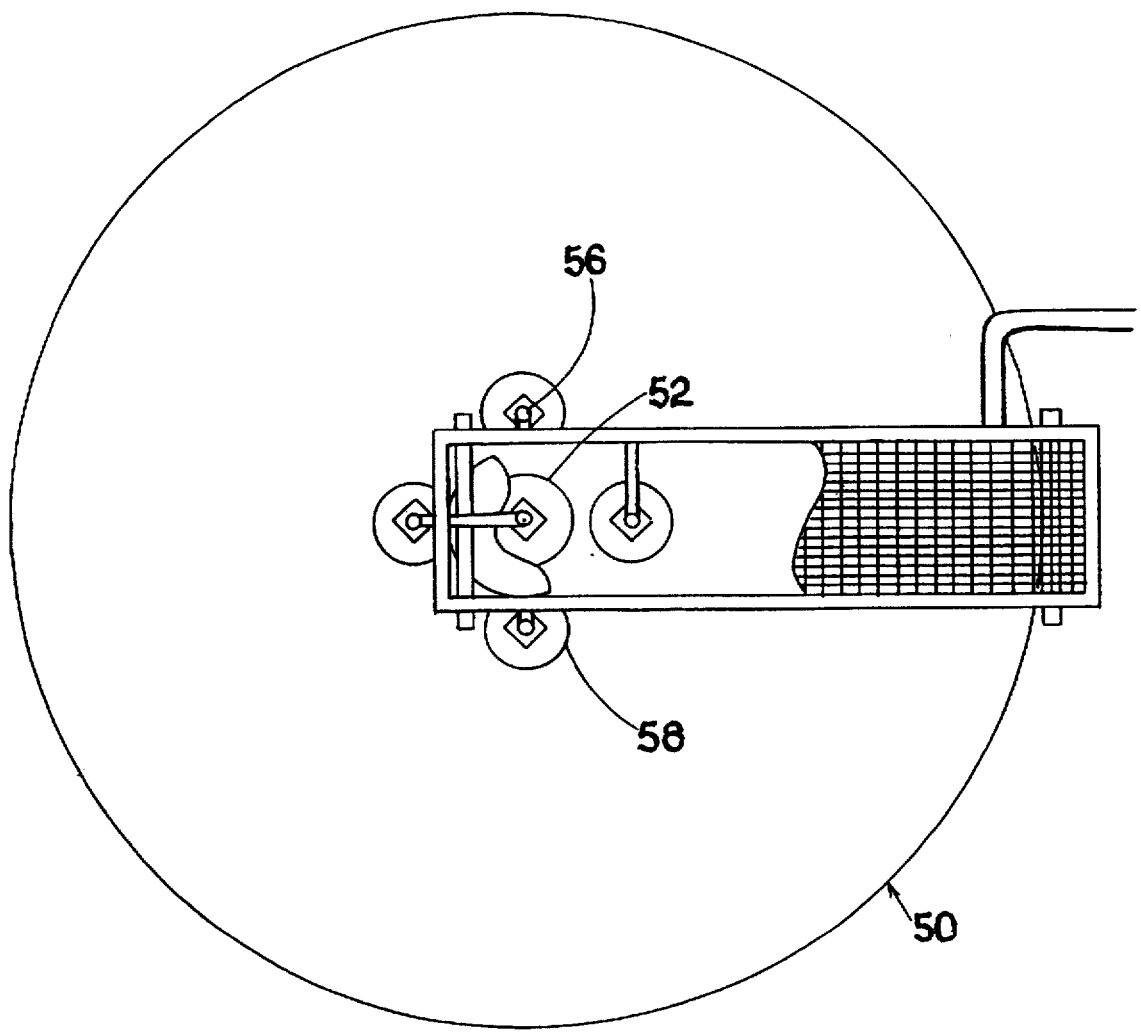
FIG. 5 is a schematic plan view, partially cut away, showing another embodiment of the invention.
Figure 6:
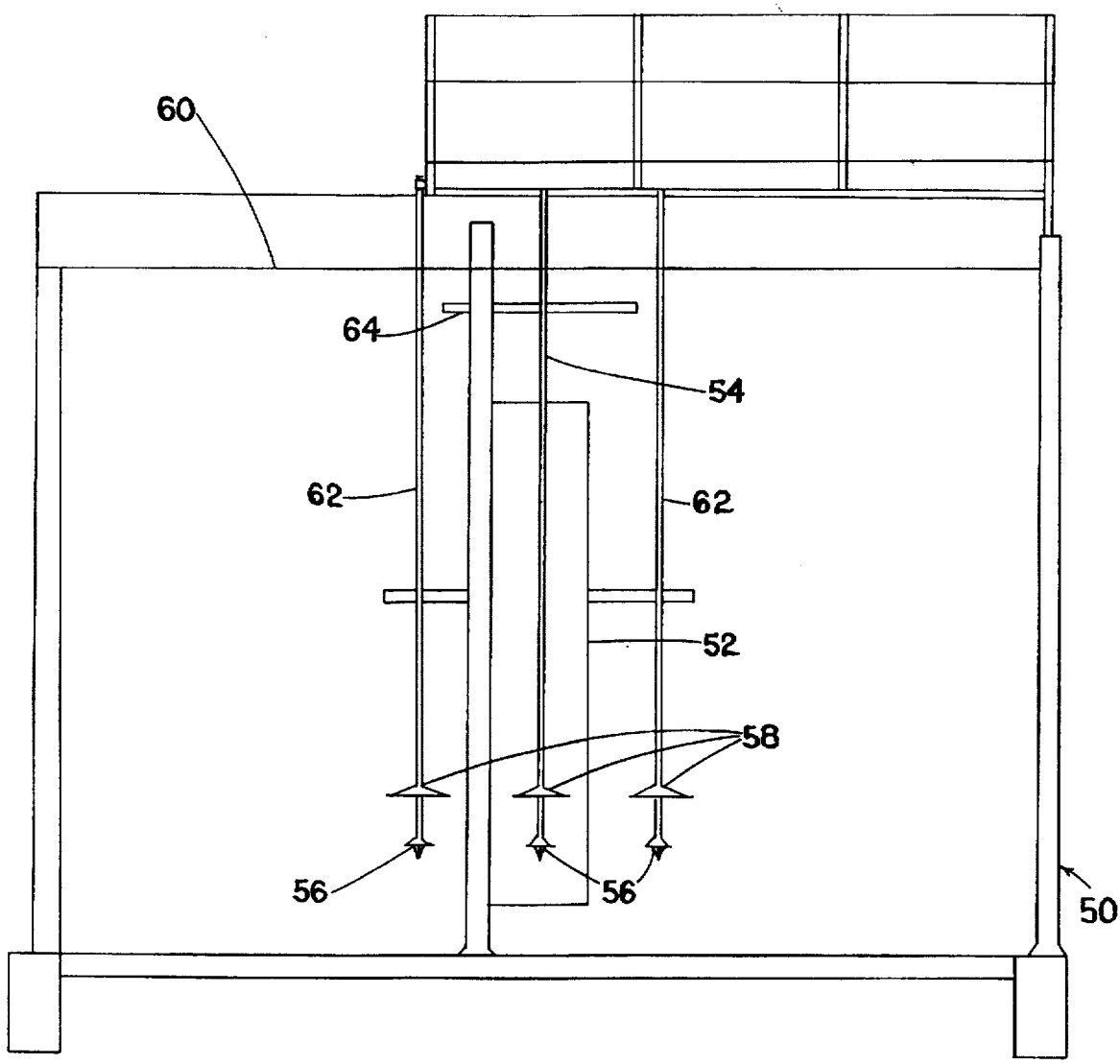
FIG. 6 is an elevational section view of the embodiment of FIG. 5.

FIGS. 5 and 6 show another configuration of the digester system according to the invention. A digester basin 50 has a central draft tube 52 with at least one air drop pipe 54 terminating in a diffuser 56 and, in this case, shown with a bubble-shearing baffle 58 over the draft tube diffuser 56. As an example only, this digester basin may be about 21 feet in diameter, with a depth of about 17 feet and a water level 60 a few feet below the top. The central draft tube may be only about two feet in diameter in this case, or it may be somewhat larger, with additional diffusers within the draft tube.

In this case a plurality (e.g., four) of air drops 62 are provided outside the central draft tube 52. These air drop pipes terminate in diffusers 56 and have baffles 58 above the diffusers. Above the central draft tube may be included a energy recovery baffle plate 64 as in earlier embodiments.

In this embodiment of the invention, the peripheral air drops 62 supply additional mixing potential to the basin 50, addressing less active areas of air/liquid mixing which would otherwise occur, particularly in the middle one-third of the liquid depth.

Figure 7:
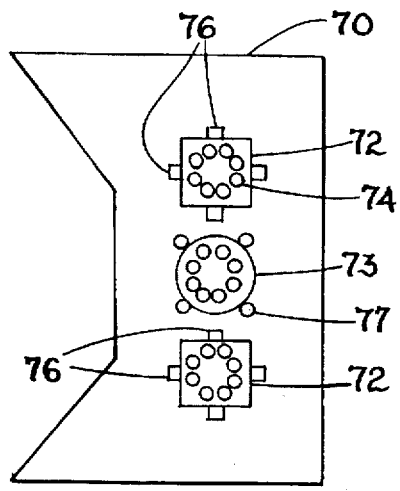
FIGS. 7 through 11 show various configurations of aeration basins incorporating main draft tubes and peripheral draft tubes.

FIGS. 7-11 show various configurations of digester basins, including irregular configurations. In each drawing one or more "central" draft tubes, or main draft tubes, has gas diffusers within these draft tubes and peripheral draft tubes surrounding the outside of the main draft tube. For example, FIG. 7 shows an irregularly shaped basin 70, which is aerated by three main draft tubes 72 and 73, each with an array of diffusers 74 inside. In each case the main draft tube 72 or 73 has peripheral draft tubes 76 or 77 at the outside. The main draft tubes 72 and peripheral draft tubes 76 are square, while the main draft tube 73 and peripheral draft tubes 77 are circular.

Figure 8:
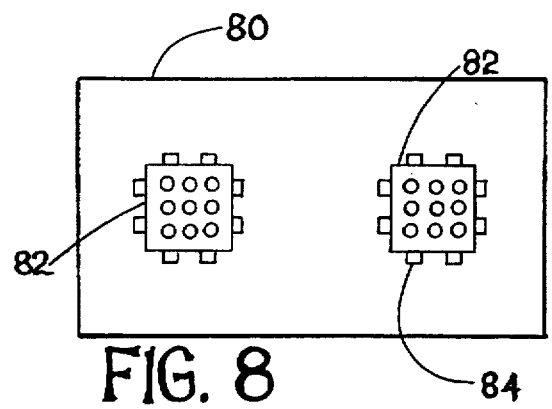
Figure 10:
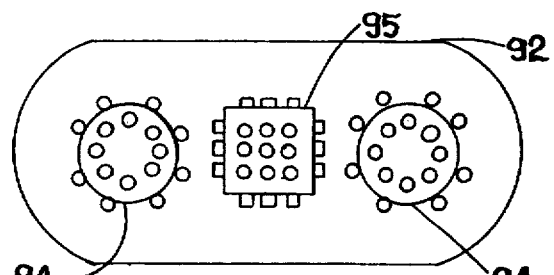
Figure 9:
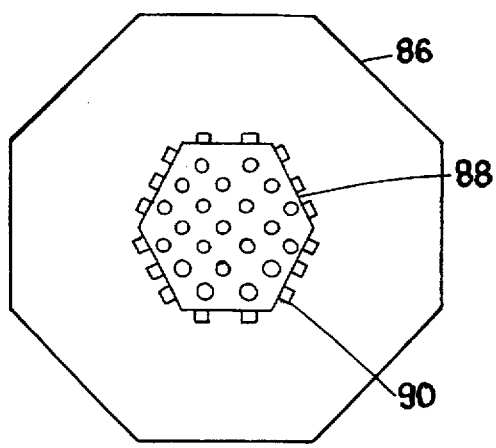
Figure 11:
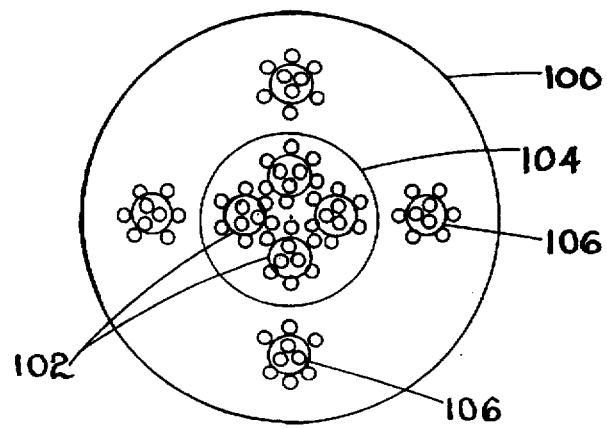

In FIG. 8, a basin 80 is shown with two square main draft tubes 82, each surrounded by peripheral square draft tubes 84. Similarly, FIG. 9 shows an octagonal basin 86 with an octagonal main or central draft tube 88, surrounded by peripheral draft tubes 90. FIG. 10 shows a race track shaped basin 92 with three main draft tubes 94 and 95, each with an array of peripheral draft tubes. FIG. 11 shows a further embodiment wherein a circular basin 100 has four centrally located main draft tubes 102, each with an array of peripheral draft tubes, and these four centrally located main draft tubes are surrounded by a further, large draft tube 104. Additional peripherally located draft tubes 106 surround the large draft tube 104, but the draft tubes 106 function as main draft tubes in that each has its own peripheral draft tubes. This arrangement can be used for very large basins.

The above-described preferred embodiments are intended to illustrate the principles of the invention, but not to limit its scope. Other embodiments and variations to these preferred embodiments can be made by those of skill in the art without departing from the essence of the invention as defined in the following claims.

I claim:

1. In an aerobic or anaerobic system comprising a basin containing a liquid, and a central or main draft tube submerged in the liquid and positioned within the basin, the draft tube circumscribing at least one gas diffuser attached to a gas line and from which gas bubbles issue when gas is delivered under pressure through the drop pipe, a majority of the gas bubbles and associated currents created by the gas bubbles circulating up through the draft tube, then horizontally toward the perimeter of the basin, down toward the floor of the basin and ultimately drawn back into the bottom of the draft tube, the improvement comprising:

a plurality of peripheral draft tubes shorter than the central draft tube and mounted peripherally around the central draft tube, each peripheral draft tube circumscribing at least one gas diffuser positioned within the draft tube, the gas diffusers in the peripheral draft tubes releasing gas bubbles which rise up through each peripheral draft tubs and circulate the liquid and gas bubbles primarily inwardly of the currents created by the gas bubbles from the central draft tube and which are eventually drawn back into the bottom of the peripheral draft tubes, whereby the peripheral draft tubes improve the distribution of and mixing of the gas into the liquid.

2. The system of claim 1, including a deflector positioned above at least one of the peripheral draft tube to shear gas bubbles rising from the peripheral draft tube into smaller gas bubbles, thereby increasing the gas transfer efficiency in the basin.

3. The system of claim 1, including an energy recovery baffle plate positioned generally horizontally in the basin, above the central draft tube and below the surface of the liquid to retain energy of the liquid/gas interfaces by deflecting outwardly bubbles rising from the central draft tube which would otherwise rise directly to the surface, thereby increasing mixing efficiencies in the basin.

4. The system of claim 3, wherein the energy recovery baffle plate is positioned within about twelve inches below the surface of the liquid in the basin.

5. The system of claim 3, wherein the energy recovery baffle plate extends horizontally beyond the draft tube in all directions.

6. The system of claim 3, wherein the energy recovery baffle plate is non-planar.

7. The system of claim 1, wherein the system is an aerobic digester system and the gas provided through the diffusers is air.

8. The system of claim 1, wherein the individual peripheral draft tubes have differing diameters.

9. The system of claim 1, wherein the peripheral draft tubes are of differing lengths.

10. The system of claim 1, wherein the peripheral draft tubes are positioned around the central draft tube in non-symmetrical arrangement.

11. The system of claim 10, including adjustment means for enabling adjustment of the position of at least some of the peripheral draft tubes, in order to optimize gas/liquid mixing in the basin.

12. The system of claim 1, wherein at least some of the peripheral draft tubes are non-circular in cross section.

13. The system of claim 1, wherein the depths of the gas diffusers within the peripheral draft tubes vary.

14. The system of claim 13, including means for adjusting the depths of at least some of the diffusers within the peripheral draft tubes.

15. The system of claim 1, wherein the peripheral draft tubes are positioned at different distances from the central draft tube.

16. The system of claim 15, including position adjustment means for adjusting the distance of at least some of the peripheral draft tubes from the central draft tube.

17. The system of claim 1, wherein the diameter to depth ratio of the basin is greater than 2.

18. The system of claim 1, wherein the central draft tube comprises a double throw design draft tube.

19. The system of claim 1, wherein the peripheral draft tubes are of smaller horizontal dimension than the central draft tube.

* * * * *